March 16, 1948. H. W. JONKHOFF 2,437,823
WHEELED CARRIAGE FOR VEHICLES
Filed Aug. 23, 1944 3 Sheets-Sheet 2
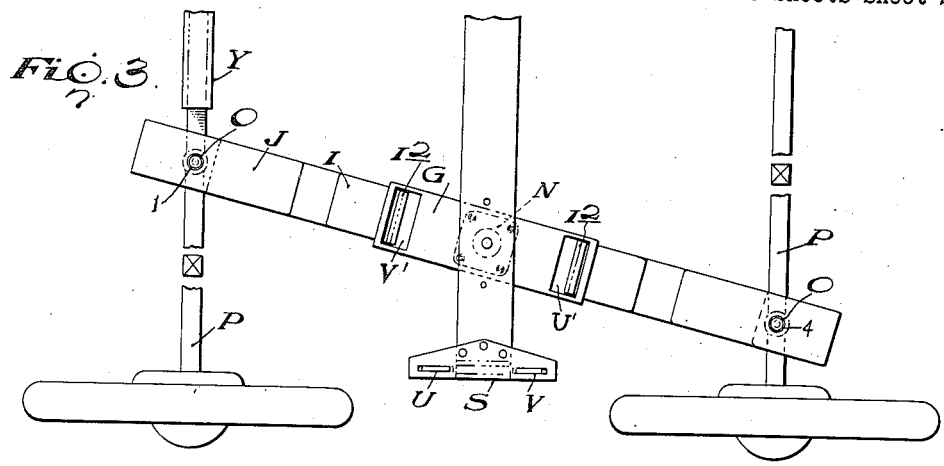
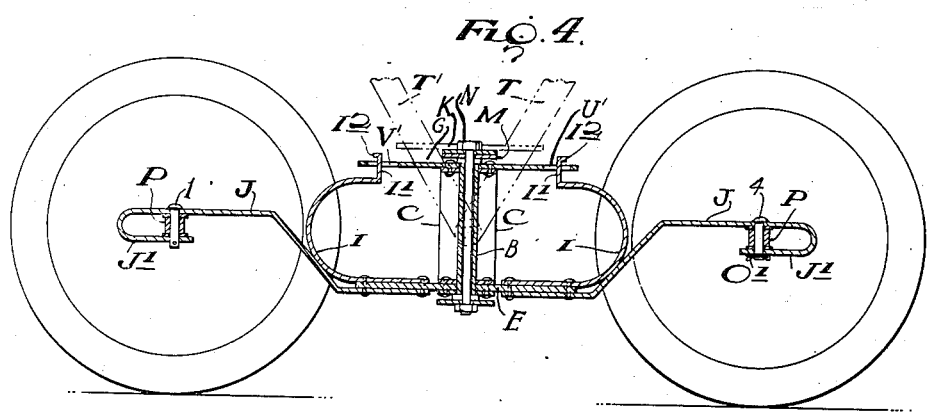
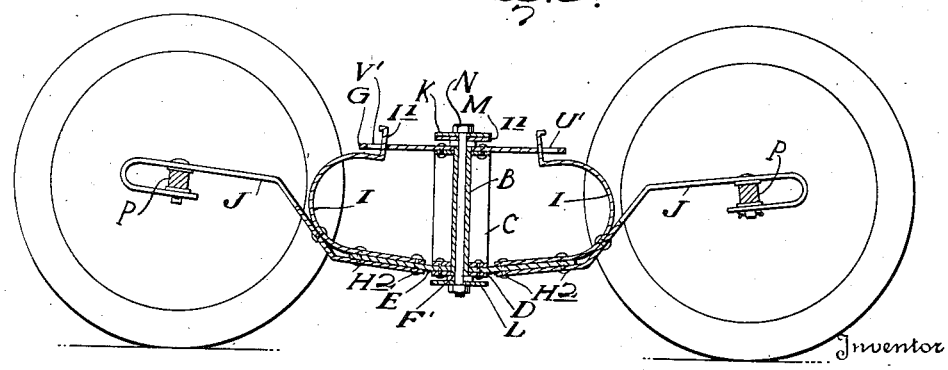
Inventor
Henri W. Jonkhoff
By
Attorney

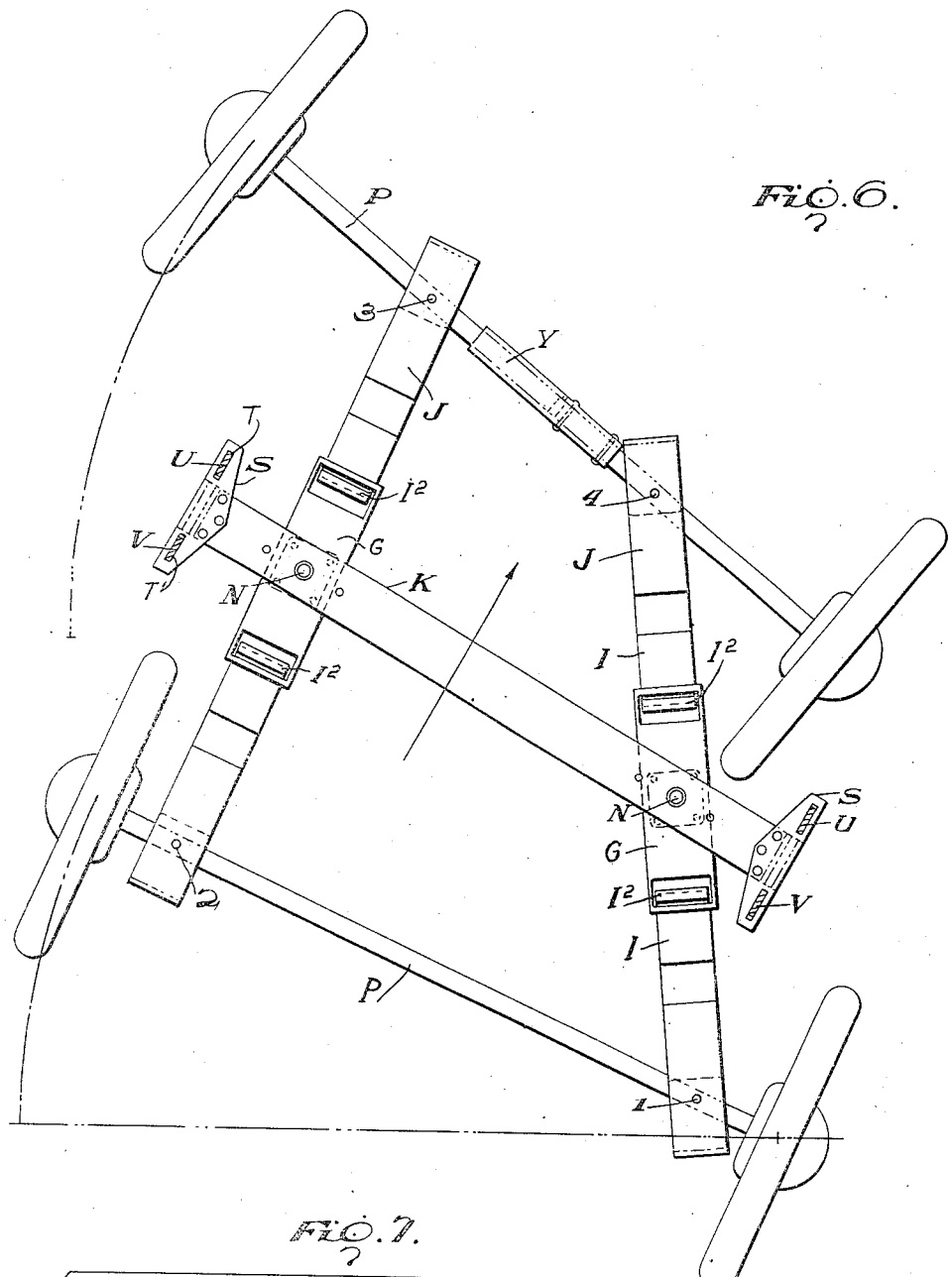

Patented Mar. 16, 1948

2,437,823

UNITED STATES PATENT OFFICE 2,437,823

WHEELED CARRIAGE FOR VEHICLES

Henri W. Jonkhoff, New York, N. Y.

Application August 23, 1944, Serial No. 550,785

21 Claims. (Cl. 280—48)

The invention relates to a wheeled carriage or truck of the type in which the wheels of the carriage or truck are pivotally connected to the right and left side of a vehicle load supporting member or platform.

In the drawings:

Figure 3 is a detail top plan view, showing the normal position of one-half of the truck relative to the cross frame.

Figure 4 is a vertical longitudinal section of the truck, showing the parts in unloaded position.

Figure 5 is a view similar to Figure 4, showing the parts in loaded position.

Figure 6 is a top plan view of the truck with wheels in position for rounding a curve.

Figure 7 is a detail view of a slightly modified means providing a sliding connection between the front axle and the arms J.

Instead of using a cross beam on the platform as a base for the two king pins N, a cross frame or bolster comprising parts K, M, L is used in which the upper and lower ends of the pins are mounted so as to stabilize the lower ends of the king pins N by interconnecting members K, M, L fixed to the body side members T, T' of a perambulator or other like vehicle, which side members are in practice connected at their upper portions to the vehicle body and to the handles and cooperate with the bolster to support the body from the running gear.

The invention provides for the use of front and rear cross wheel axles P, each carrying a right wheel and a left wheel, said cross axles, by means of the pivotal connections 1, 2, 3, 4 supporting the outer extremities of two longitudinally extending axle carrying bars or arms J, flexibly connected to cushioning springs or resilient supporting members, pivotally connected to the platform cross frame.

This combination provides an automatic steering device because the vehicle platform can be used as a steering lever to guide the vehicle to right and left and around curves. The right and left wheel carrying bars or arms form the longitudinal side members of a quadrangle 1, 2, 3, 4 pivotally connected to the front and rear axles representing the two end members of the quadrangle. On account of the pivotal connections between the four members the quadrangle is rendered flexible. The two side members J being pivotally connected at 1—4 and 2—3 to the axles and being pivotally connected intermediate of their lengths to the platform cross frame K by means of the king pins N makes it possible to change the angular relationship of the longitudinal members J and axles by moving the king pin at one side of the platform cross frame ahead of the other king pin to effect steering actions. By this means the parts are shiftable to change the longitudinal axis of the truck from one extending on a straight line to one extending on a curved line. As a result, the inner rear wheel may be caused to rotate around its contact point on the ground while the outer rear wheel is caused to travel in a circular track or curve of small radius. At the same time the front wheels will be caused to turn in the same direction along a circular track or curve of greater radius because the member J of the transformed quadrangle at the outer side of the curve forces the outer end of the front axle P at that side of the curve forward of the opposite end of the axle at the inner side of the curve. (See Fig. 6.)

Figure 1:
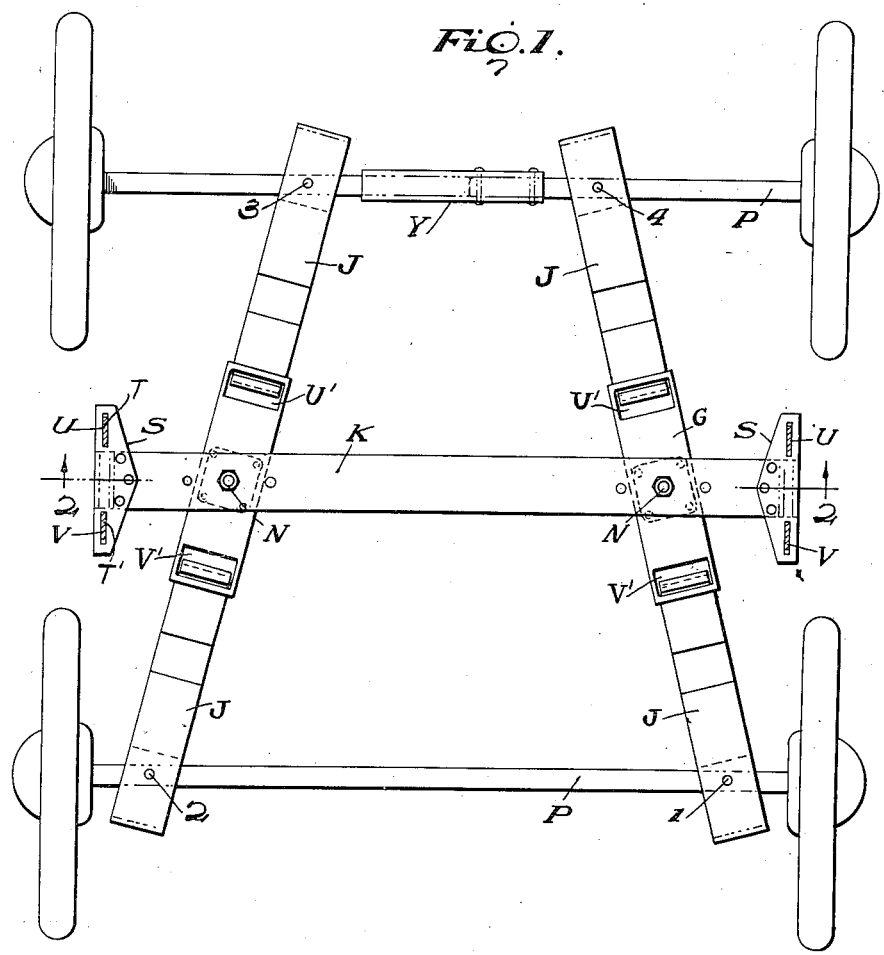
Figure 1 is a top plan view of the wheeled carriage.

In order to make the steering practical, in rounding a curve, the deviation of the front axle from its normal position should exceed that of the rear axle. This can be attained at by spacing the pivotal connections 1—2 of the wheel carrying arms on the rear axle farther apart than the pivotal connections 3—4 on the front axle. The greater the difference in space between the pivotal connections on the front and rear axles, the smaller the curves which can be managed by the vehicle at a fixed deviation from the straight by the platform. (See Figure 1.)

Now, in a transformed quadrangle of this kind, in traversing curves there always will be created an outward stress on the pivots of the front axle, which would not happen in a regular parallelogram.

The smaller the curve, the greater the stress on account of greater resistance of the parts to a free turning motion. Therefore, provision is made so as to allow the pivots on the front or rear axle to space themselves farther apart during the rounding of curves in order to reduce or release the stresses in the structure. One way in which this may be accomplished is by using a divided front axle and securing to one-half of the front axle a sleeve Y into which the inner end of the other part of the axle is slidably mounted or telescopes, as clearly shown in Figures 1–6. If preferred, the front axle may be provided with elongated slots Y' in which the pivots 3 and 4 may slide for the same purpose, as shown in Figure 7.

In the design, illustrated in the drawing (Figures 4 and 5) showing the side view, the wheel carrying bars or arms at each side of the truck are mounted at their inner ends on the extremities of a spring blade or plate E extending longitudinally in opposite directions beyond the pivot pin connecting the side frame bar or member J with the platform cross frame or bolster K.

The complete design, embodying the vehicle carrying platform or bolster and the two truck side frame members J, is different from similar former constructions, in that the position of the two side frame members J in regard to each other is not a parallel one. Furthermore, in that the two frame members J are pivotally interconnected by means of cross wheel axles, which are parallel to each other only when the wheels are arranged to travel in a straight line, each pair of right and left truck wheels being carried parallel to each other on a common axle. Another special feature of the combination can be found in the fact that the weight of the platform is distributed to the front and rear axles directly by the flexibly mounted side frame members or wheel carrying arms J carrying the load. Finally, the present structure differs from prior ones in that the truck can support a complete platform instead of only one end of a platform, the other end of which usually has to be additionally sustained. This is made possible because, on account of the connections on the supporting cross axles, the platform is prevented from tipping over. The structure, therefore, makes up a four-wheeled vehicle incorporating independently sprung wheels and springing and steering device with very simple means.

The vehicle body carrying bolster or support K extends from one side to the other of the vehicle body. At each end the support K is bent downwards and connected to the outer downbent ends of the bolster and to a bracket plate S, which holds the body side members T fastened thereto, said members T being disposed between the downbent ends of members K—M and passing through holes U—V in the plates S, and being bolted to K—M, thus making a rigid connection between the body and the member K, preventing the tipping of the body. The cross frame is formed by the main upper cross bar K and a shorter lower cross bar L which in its middle is fixed to the inner diagonally arranged ends of the braces M, so that the cross frame forms a bridge. Another member $U^2$, connecting the lower bar L of the frame to the body, adds to the stability in the longitudinal direction of the vehicle.

Fig. 3 shows the normal position of each wheel carrying member J in regard to said cross frame. Each member J swivels around a king pin N in the cross frame. Its outer ends are pivotally connected to the cross wheel axles at O.

Figure 2:
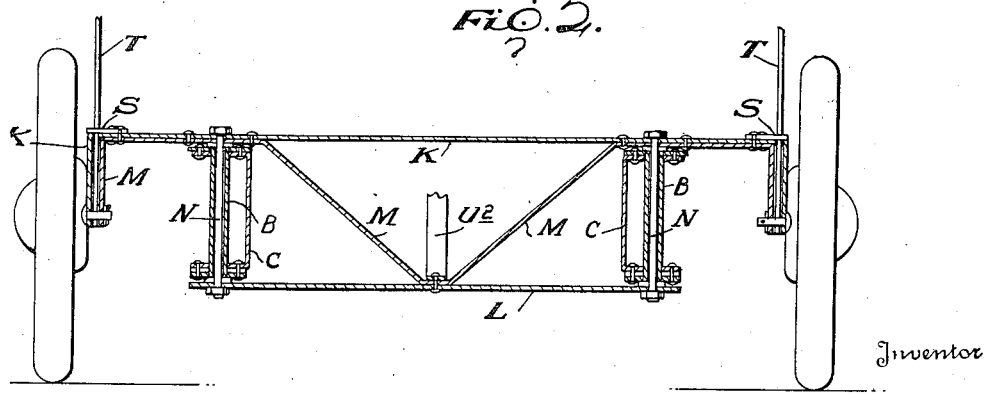
Figure 2 is a vertical transverse sectional view on the line 2—2, Figure 1.

As can be seen in the drawings, Figures 2, 4 and 5, a vertical bracket C, having bent ends D secured to the spring member E and bracket G and carrying a bearing sleeve B rotatable about the king pin N, can turn freely between the upper frame member M and the lower frame member L, from each of which it is separated by a washer $F^1$.

In Figs. 2 and 3 the wheel carrying arms J on each side of the vehicle are shown as mounted on the ends of a flat leaf spring E, and secured thereto by rivets $H^2$ in such a way that the leaf spring is clamped between the arms J and the lower ends of substantially U-shaped spring members I. The members I terminate at their upper ends in retaining portions $I^1$, having right angular stop extensions $I^2$. The free ends of the wheel carrying arms are, for the purpose of illustration, provided with return bends $J^1$ which serve as a stop by contacting the axle, thus limiting the horizontal movement of the quadrangle, the axle being secured within the return bend $J^1$ of the arm by means of a pin, belt, etc., O held in locked position by means of a cotter pin O'. The parts E, I, C and G associated with each frame bar or set of arms J form a shock absorbing spring bolster carrying the bar or arms J and supporting the body or load carrying bolster K therefrom and which swivelly connects said bar J to the bolster K.

The top bracket member G of the above-described spring bolster is provided at its end with elongated slot U', V' in which the upper ends $I^1$ of the springs I of the chassis are movably held, whereby the wheel carrying arms are limited in their vertical movements to protect the spring E from excessive bending movements, the ends $I^1$ moving back and forth in the slots according to the road and the load on the vehicle.

Fig. 4 shows the parts in their normal position, as when the vehicle is unloaded or partly loaded, and Fig. 5 shows the parts when both sets of wheel carrying arms J are deflected upwardly by unevenness of a road surface, in which said arms and the springs E and I are placed under stress and operate to absorb the shocks falling thereon. In either of these positions the spring bearing bolster is capable of moving around the king pin N and in such shock absorbing actions the springs E and I are limited in their actions by the stops I' and by their stiffened portions fastened to the arms, whereby bending of the arms and springs to an excessive degree is prevented.

What I claim is:

1. In a vehicle running gear for supporting a body by front and rear wheels, disposed at the front and rear of the vehicle, respectively, a pair of transverse axles, front and rear, for the front and rear wheels, respectively, a cross frame member supporting the body and which in turn is connected to and supports and is supported by the axles, and supporting and steering connections between the cross frame member and axles, comprising longitudinal members pivotally mounted on said frame member, and extending rearward and forward of the frame member and pivotally connected at their front and rear ends to the axles, the pivotal connections of said longitudinally extending members with the rear axle being spaced further apart than the pivotal connections of said members with the front axle.

2. In a vehicle, a body, and a wheeled carriage for supporting said body, comprising a body supporting member and a flexible quadrangle consisting of two parallel cross wheels axles, side members pivotally connecting the front and rear axles and disposed in angular position relative to each other and constituting the side members of the quadrangle and pivotally connected at their centers to the body supporting member, whereby the quadrangle can be transformed when the pivot points of one of the members are moved ahead of the pivot points of the other member.

3. In a vehicle running gear for supporting a body by front and rear wheels, disposed at the front and rear of the body, respectively, in combination with body supporting means, longitudinally extending steering rods pivotally mounted between their ends on said supporting means on opposite sides of the longitudinal center of the vehicle, wheel axles, and means pivotally connecting the ends of the rods to said axles, the pivotal connections of the rods with the respective axles being differently located for each axle relative to the longitudinal center line of the gear.

4. In a vehicle, a wheeled body supporting carriage, comprising a transverse body supporting member and a flexible frame consisting of front and rear transverse axles disposed respectively, in advance and in rear of said transverse member and side members pivotally connecting the front and rear axles and pivoted intermediate their ends to the body supporting member, said pivots being so relatively arranged that the frame may be transformed to change the arrangement of the axles for steering actions through angular movement of one of the transverse members with relation to the longitudinal center line of the carriage to vary the arrangement of the pivots of at least one of the axles.

5. A wheeled carriage for vehicles comprising a transverse body supporting member, and a flexible transformable isosceles trapezoidal frame consisting of a pair of parallel front and rear transverse members, and a pair of angularly arranged longitudinal side members pivotally coupled at their front and rear ends to said front and rear transverse members, said side members being pivotally coupled to the transverse body supporting member between their ends to swing laterally relatively to the vehicle to change the arrangement of the pivotal connections between the same and the transverse members to transform the frame, and front and rear wheels carried by the frame and relatively shiftable for steering actions by the transformation of the frame.

6. In a running gear for a vehicle body disposed underneath the body, a bolster including an upper transverse bar secured to the underside of the body and a lower transverse bar connected to said upper bar, side bars pivotally mounted between their ends on the lower transverse bar of the bolster adjacent the sides of the vehicle body in front and rear of the bolster, front and rear non-rotative axles disposed transversely of the body, pivotal connections between the front ends of the side bars and the front axle and the rear ends of said side bars and the rear axle, and springs connected to the bolster and side bars for cushioning shock forces on the axles from transmission to the body.

7. A steerable running gear for a wheeled vehicle comprising in combination vehicle body supporting means including a central transverse body supporting bolster and means for connecting the same with the vehicle body, said bolster being movable angularly relatively to the longitudinal center line of the vehicle, longitudinally extending members pivoted intermediate their ends to the body supporting means to adapt them to swing laterally and move longitudinally in opposite directions under force applied through such angular movements of the bolster, and wheels shiftable by such movements of the longitudinally extending members for steering actions.

8. In a steerable running gear for vehicles, the combination comprising a pair of wheeled axles, a pair of longitudinally extending ties pivoted for steering movements at their front and rear ends respectively to the front and rear axles at different points for each axle relative to the longitudinal center line of the gear, a pair of yokes each having parallel portions and a connecting web, a load carrying cross member supported by said longitudinally extending ties, and means extending through said cross member and the parallel portions of said yokes for rotatably connecting the cross member to said longitudinally extending ties.

9. In a steerable undercarriage for vehicles, the combination comprising two wheel carrying shaft members and a body supporting cross member normally disposed in substantially parallel relationship to one another, and load carrying means flexibly connected to said shaft members and the body supporting cross member for mutually supporting said body supporting and shaft members from each other and effecting swinging movements of two of said members relative to the third for steering actions as a result of force applied to one of the members.

10. A vehicle running gear for supporting a body by front and rear wheels, disposed at the front and rear of the vehicle respectively, comprising a pair of transverse axles, front and rear, for the front and rear wheels respectively, a central transverse member supporting the body and which in turn is connected to and supported from the axles, the connection between said central transverse member and the axles comprising a pair of longitudinals connected to said member and to each of the axles at points remote from the longitudinal center line of the gear by means permitting relative rotative movement in a horizontal plane between the longitudinals and the parts to which they are connected, the several points of connection of each longitudinal with said axles being so differently located relative to the longitudinal center line of the gear, that if one of the three transverse members is shifted relatively to the longitudinal center line, differential movement among the three will be enforced to provide a steering action.

11. A vehicle running gear for supporting a body by front and rear wheels, disposed at the front and rear of the vehicle respectively, comprising a pair of transverse axles, front and rear, for the front and rear wheels respectively, a central transverse member supporting the body and which in turn is connected to and supported from the axles, the connection between said central transverse member and the axles comprising links extending from points adjacent the ends of said transverse member to points on the axles at either side of the center thereof, the links being connected to said parts with freedom of angular movement in a horizontal plane relative thereto, the points of connection being so differently located relative to the longitudinal center line of the vehicle that if said transverse member is shifted relatively to said center line, at least one of the axles will be angularly turned to effect a steering action.

12. A vehicle comprising a body and a running gear supporting the body by front and rear wheels disposed at the front and rear of the vehicle respectively, the running gear comprising a pair of transverse axles, front and rear, for the front and rear wheels respectively, a central transverse member connected to and supporting the body and which in turn is connected to and supported from the axles, the connection between said member and the axles comprising a pair of longitudinals connected to said member and to each of the axles at points remote from the longitudinal center line of the gear by means permitting relative rotative movement in a horizontal plane between the longitudinals and the parts to which they are connected, the several points of connection of each longitudinal with said axles being differently located for each axle relative to the longitudinal center line of the gear, the supporting connections between the axles and body including springs cooperating with the central transverse member to support the body and which cushion shock forces on the axles from transmission to the body whereby a turning force applied to the cushioned body will be transmitted through said supporting connections to enforce differential movement between the three transverse members to provide a steering action.

13. A vehicle running gear for supporting a body by front and rear wheels, disposed at the front and rear of the vehicle respectively, comprising a pair of transverse axles, front and rear, for the front and rear wheels respectively, a central transverse member and longitudinally extending cushioning springs connected thereto for yieldingly supporting the body, and means for supporting said transverse member and springs from the axle members, said means comprising a pair of longitudinals connected to said transverse member and to the axle members at points remote from the longitudinal center line of the gear by means permitting relative rotative movement in a horizontal plane between the longitudinals and the parts to which they are connected, the several points of connection of each longitudinal being so differently located for each axle relative to the longitudinal center line of the gear, that a turning force applied to the cushioned body will be transmitted conjointly through the springs and central transverse member to enforce differential movement between the three transverse members to provide a steering action.

14. A vehicle running gear for supporting a body by front and rear wheels, disposed at the front and rear of the vehicle respectively, comprising a pair of transverse axle members, front and rear, for the front and rear wheels respectively, a central transverse member supporting the body and which in turn is supported from the axles, the connection between said member and the axles comprising pairs of links respectively connecting said member with the respective axles at points remote from the longitudinal center line of the gear to permit relative rotative movement in a horizontal plane between the links and the parts to which they are connected, the several points of connection of the links with the axles being differently located for each axle relative to the longitudinal center line of the gear, the supporting connections between the axle members and body including springs connected to the central transverse member which cushion shock forces on the axle members from transmission to the body whereby a turning force applied to the cushioned body will be transmitted through the springs and central transverse member to enforce differential movement between the three transverse members to provide a steering action.

15. A vehicle running gear for supporting a body by front and rear wheels, disposed at the front and rear of the vehicle respectively, comprising a central transverse body supporting bolster member, a pair of transverse axles, front and rear, for the front and rear wheels respectively, located in front and rear of the bolster, and connecting means between said bolster and the axles comprising a pair of longitudinals mutually supporting the bolster from the axles and the axles from the bolster, said longitudinals being connected with the bolster and the axles at points remote from the longitudinal center line of the gear by flexible connections permitting relative rotative movement in a horizontal plane between the longitudinals and the parts to which they are connected, the longitudinals and axles forming a flexible frame supporting the bolster and supported thereby and having its flexible connections so differently located relative to the longitudinal center line of the gear that pressure applied to one of the three transverse members will cause differential movement among the three to transform the frame to provide a steering action.

16. A vehicle running gear for supporting a body by front and rear wheels, disposed at the front and rear of the vehicle respectively, comprising a pair of transverse axles, front and rear, for the front and rear wheels respectively, a central transverse member supporting the body and which in turn is connected to and supports and is supported from the axles, and supporting and steering connections between said member and axles constituting carriers supporting said member from the axles and the axles from said member, said connections embodying longitudinal reaches connected to said member and to the axles at points remote from the longitudinal center line of the gear by means permitting relative rotative movement in a horizontal plane between the reaches and the parts to which they are connected, the points of connection of the reaches with the axles being so differently located relative to the longitudinal center line of the gear, that, if one of the three transverse members is shifted relatively to the center line, differential movement among the three will be enforced to provide a steering action.

17. A vehicle running gear for supporting a body by front and rear wheels, disposed at the front and rear of the vehicle respectively, comprising a pair of transverse axles, front and rear, for the front and rear wheels respectively, a central transverse member having a connection at each of its ends with the body and supporting the body and which in turn is connected to and supports and is supported by the axles, and supporting and steering means forming mutual supporting connections between said member and the axles, said means including links extending from points adjacent the ends of said transverse member to points on the axles at either side of the center thereof, the links being connected to said parts with freedom of angular movement in a horizontal plane relative thereto, the location of the points of connection being so differently located with relation to the longitudinal center line of the vehicle that if said central transverse member is shifted relatively to said center line at least one of the axles will be angularly turned to effect a steering action.

18. A vehicle running gear for supporting a body by front and rear wheels, disposed at the front and rear of the vehicle respectively, comprising a pair of transverse axle members, front and rear, for the front and rear wheels respectively, a central transverse member connected to and supporting the body and which in turn is connected to and is supported by the axle members, the connecting means between said central transverse member and the axle members comprising a pair of longitudinals connected to said central transverse member and to the axle members at points remote from the longitudinal center line of the gear by means permitting relative rotative movement in a horizontal plane between the longitudinals and the parts to which they are connected, the points of connections of the longitudinals with the three transverse members being so differently located relative to each other and to the longitudinal center line of the gear that motion applied to incline one of the three transverse members relatively to said center line will enforce differential movement among the three to provide a steering action.

19. A vehicle running gear for supporting a body by front and rear wheels, disposed at the front and rear of the vehicle respectively, comprising a pair of transverse axles, front and rear, for the front and rear wheels respectively, a central transverse member supporting the body and which in turn is supported from the axles, and supporting and steering connections between the parts including a pair of longitudinals connected to the transverse member and to the axles at points remote from the longitudinal center line of the gear by means permitting relative rotative movement in a horizontal plane between the longitudinals and the parts to which they are connected, the several points of connection of each longitudinal being differently located for each axle relative to the longitudinal center line of the gear, whereby a turning force supplied to one of the transverse members will enforce differential movement between the three transverse members to provide a steering action, and means for limiting such movement of the members.

20. A vehicle running gear for supporting a body by front and rear wheels, disposed at the front and rear of the vehicle respectively, comprising a pair of transverse axle members, front and rear, for the front and rear wheels respectively, a central transverse member connected to and supporting the body and which in turn is connected to and supports and is supported by the axles, and longitudinally extending springs connected to the central transverse member to cushion shock forces from the axles to the body, the connection between said member and the axles comprising a pair of longitudinals connected to said member and to the axles at points remote from the longitudinal center line of the gear by means permitting relative rotative movement in a horizontal plane between the longitudinals and the parts to which they are connected, the several points of connection of each longitudinal being differently located for each axle relative to the longitudinal center line of the gear, whereby a turning force applied to the cushioned body will be transmitted through the springs and central transverse member to enforce differential movement between the three transverse members to provide a steering action.

21. In a supporting and steering gear for a vehicle body supported by front and rear axles, a body supporting means including a transverse bolster, transverse wheel carrying axles disposed respectively in front and rear of the bolster, and longitudinals jointed to the bolster and axles at points remote from the longitudinal center line of the gear and connecting them for relative angular movement with respect to each other and to the longitudinal center line of the gear and mutually supporting the bolster from the axles and the axles independently of the body from the bolster, said points joining said axles and said longitudinals being differently located for each axle with relation to the longitudinal center line of the gear, the axles and longitudinals forming a combined supporting and steering frame normally holding the wheels in position for straight line travel of the vehicle and being relatively movable in a horizontal plane on the joint connections for transformation of the frame to effect relative adjustment of the wheels for steering actions.

HENRI W. JONKHOFF.

REFERENCES CITED

The following references are of record in the file of this patent:

UNITED STATES PATENTS

| Number | Name | Date |
| --- | --- | --- |
| 233,503 | Greenleaf | Oct. 19, 1880 |
| 412,740 | Fax | Oct. 15, 1889 |
| 739,703 | Nellans | Sept. 22, 1903 |
| 846,606 | Patterson et al. | Mar. 12, 1907 |
| 846,939 | Padgett | Mar. 12, 1907 |
| 1,005,909 | Weaver | Oct. 17, 1911 |
| 1,376,040 | Roberts | Apr. 26, 1921 |
| 1,926,334 | Gurton et al. | Sept. 12, 1933 |
| 2,237,575 | Quartullo | Apr. 8, 1941 |
| 2,316,374 | Townsend | Apr. 13, 1943 |
| 2,351,001 | Buckendale | June 13, 1944 |

FOREIGN PATENTS

| Number | Country | Date |
| --- | --- | --- |
| 10,927 | Great Britain | July 28, 1888 |
| 154,260 | Austria | Sept. 10, 1938 |